(12) United States Patent
Margetts

(10) Patent No.: US 10,996,981 B2
(45) Date of Patent: May 4, 2021

(54) PROCESSOR ZERO OVERHEAD TASK SCHEDULING

(71) Applicant: Toshiba Memory Corporation, Tokyo (JP)

(72) Inventor: Julien Margetts, Thame (GB)

(73) Assignee: Toshiba Memory Corporation, Tokyo (JP)

(*) Notice: Subject to any disclaimer, the term of this patent is extended or adjusted under 35 U.S.C. 154(b) by 69 days.

(21) Appl. No.: 16/354,559

(22) Filed: Mar. 15, 2019

(65) Prior Publication Data

US 2020/0293366 A1 Sep. 17, 2020

(51) Int. Cl.
*G06F 9/50* (2006.01)
*G06F 9/48* (2006.01)

(52) U.S. Cl.
CPC .......... *G06F 9/4881* (2013.01); *G06F 9/5038* (2013.01)

(58) Field of Classification Search
None
See application file for complete search history.

(56) References Cited

U.S. PATENT DOCUMENTS

| | | | | |
|---|---|---|---|---|
| 6,298,370 B1* | 10/2001 | Tang | ...................... | G06F 9/5044 718/100 |
| 6,643,767 B1* | 11/2003 | Sato | ...................... | G06F 9/3836 712/218 |
| 7,774,763 B1* | 8/2010 | Robillard | ................ | G06F 8/458 717/140 |
| 8,010,963 B2* | 8/2011 | Heffley | ................... | G06F 9/461 718/100 |
| 9,547,528 B1* | 1/2017 | McClure | ............... | G06F 9/4881 |
| 2001/0034558 A1* | 10/2001 | Hoskins | ............... | G11B 5/5526 700/13 |
| 2003/0037091 A1* | 2/2003 | Nishimura | ............ | G06F 9/4881 718/103 |
| 2005/0188373 A1* | 8/2005 | Inoue | .................... | G06F 9/4881 718/100 |
| 2007/0143761 A1* | 6/2007 | Deng | .................... | G06F 9/4881 718/103 |
| 2008/0163225 A1* | 7/2008 | Fragala | .................. | G06Q 10/06 718/102 |
| 2009/0113432 A1* | 4/2009 | Singh | .................... | G06F 9/4881 718/102 |
| 2010/0318995 A1* | 12/2010 | Messmer | .............. | G06F 9/4881 718/102 |
| 2015/0277865 A1* | 10/2015 | Gorissen | ................... | G06F 8/52 717/147 |
| 2019/0073241 A1* | 3/2019 | Sideris | .................. | G06F 9/3887 |

* cited by examiner

*Primary Examiner* — Isaac T Tecklu
(74) *Attorney, Agent, or Firm* — White & Case LLP

(57) ABSTRACT

A method for scheduling tasks on a processor includes detecting, in a task selection device communicatively coupled to the processor, a condition of each of a plurality of components of a computer system comprising the processor, determining a plurality of tasks that can be next executed on the processor based on the condition of each of the plurality of components, transmitting a signal to an arbiter of the task selection device that the plurality of tasks can be executed, determining, at the arbiter, a next task to be executed on the processor, storing, by the task selection device, the entry point address of the next task to be executed on the processor, and transferring, by the processor, execution to the stored entry point address of the next task to be executed.

18 Claims, 6 Drawing Sheets

PROCESSOR ZERO OVERHEAD TASK SCHEDULING

FIELD OF THE INVENTION

The present invention generally relates to systems and methods to automate the scheduling of tasks on a processor.

BACKGROUND OF THE INVENTION

Computer systems often require running multiple independent tasks on a single processor. Conventionally, scheduling the execution of tasks is software-dependent and involves the overhead of a multi-tasking operating system or runtime environment. In one approach for conventional systems that avoids this overhead, the processor runs in a loop, calling each task in turn which on entry polls status registers to check whether prerequisite conditions required for execution of the task are present to determine if it can proceed. If the prerequisite conditions are not fulfilled for a particular task, the task immediately exits and the processor calls the next task which polls the status registers for its prerequisite conditions to proceed, and so on. Polling the status registers for each task incurs unnecessary overhead and wastes between 10 and 15% of central processing unit (CPU) cycles.

Consistently polling registers at the beginning of each task not only wastes CPU cycle time and is inefficient, but also results in increased power usage for a small amount of actual work done by tasks on the processor. The processor is consistently busy polling registers to determine if and when a task can be executed.

Accordingly, there is an unmet need to design systems capable of efficiently scheduling tasks for execution on a processor.

BRIEF DESCRIPTION OF THE INVENTION

In an aspect, a method for scheduling tasks on a processor includes hardware logic of a task selection device communicatively coupled to the processor, which detects a condition of each of a plurality of components of a computer system including the processor, determines a plurality of tasks that can be executed on the processor based on the condition of each of the plurality of components, and transmits a signal to an arbiter of the task selection device indicating that the plurality of tasks can be executed. The method includes the arbiter of the task selection device which selects a first task of the plurality of tasks to be executed next on the processor. The method further includes the task selection device which determines an entry point address of the first task and the processor which transfers execution to the entry point address of the first task.

In another aspect, a system for automated scheduling of a plurality of tasks on a processor includes components necessary for the execution of the plurality of tasks, a memory communicatively coupled to the processor, and a task scheduling device communicatively coupled to the memory. The task scheduling device includes hardware logic and an arbiter. The hardware logic receives a plurality of trigger conditions from the components, changes a status bit within the hardware logic for each of the plurality of triggers, and determines a plurality of tasks that can be next executed, based on programmed relationships between the trigger conditions. The arbiter receives an enable signal for each of the plurality of tasks, and determines the next task of the plurality of tasks to be executed on the processor. The processor executes one task of the plurality of tasks at a time and schedules the next task to be executed on the processor.

DETAILED DESCRIPTION OF THE INVENTION

Figure 1:
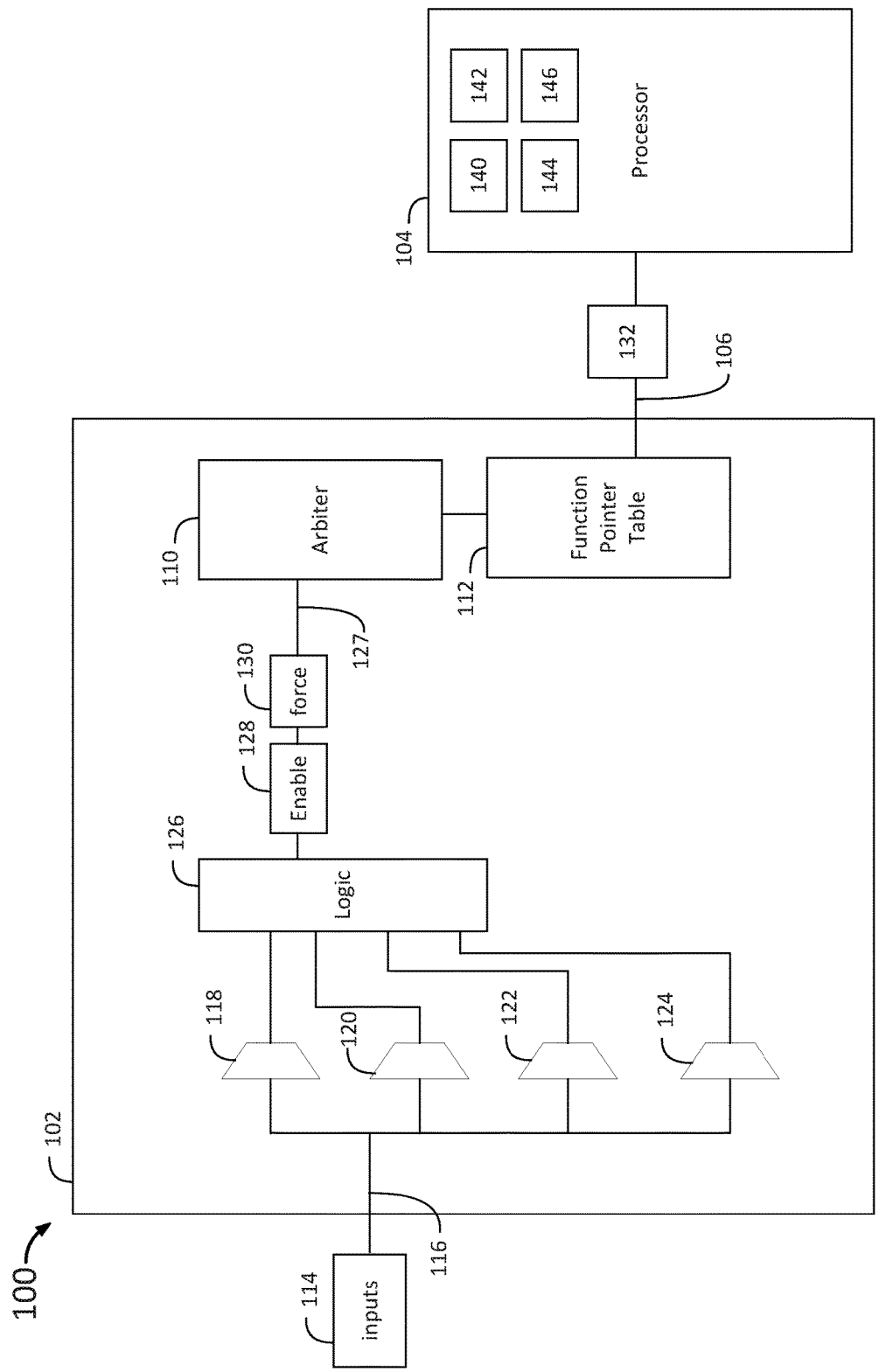
FIG. 1 shows a block diagram of a task scheduling system including hardware logic and an arbiter.

FIG. 1 shows a block diagram of a task scheduling system 100 including a task selection device 102, task trigger inputs 114 and a processor 104. The task selection device 102 includes hardware logic 126, an arbiter 110, and a function pointer table 112. The task selection device 102 is communicatively coupled to a processor 104 by a bus 106 via a memory or register 132.

The task selection device 102 includes input selectors 118, 120, 122, and 124 corresponding to the four tasks 140, 142, 144, and 146 which run on the processor 104. While only four input selectors (118, 120, 122, and 124) for four tasks (140, 142, 144, and 146) are shown for clarity, any number of tasks may be supported with a corresponding selector for each task. Task selection device 102 also includes an enable function 128 and a force function 130.

Task trigger inputs 114 are provided to task selection device 102 from the wider computer system (not shown for clarity) of which the task scheduling system 100 is a part. The inputs 114 indicate the status of various components in the computer system necessary for the execution of tasks on the processor 104. Examples of such inputs include, but are not limited to, availability or readiness of resources, notification of status of external events, and so on. Tasks may include a single command or a plurality of commands which carry out a given task.

For clarity, inputs 114 in FIG. 1 are provided to four task selectors, 118, 120, 122, and 124 for tasks 140, 142, 144, and 146, which select which inputs are relevant for the associated task. There may be any number of inputs 114 to the hardware logic 126, only limited by the space occupied or power consumed by the task selection device 102. Inputs 114 from the wider computer system may include, for example, an indication that a component is available, that space exists in a memory, or notification of an event like a data packet being available, or of a timer expiring, among other possible inputs. Each input selector has a select register input (not shown for clarity), which may be used to configure which inputs are relevant for a particular task and are to be selected.

Each task that can be executed on the processor 104 typically includes a set of prerequisite conditions needed for the task to execute. Inputs 114 include information about component statuses related to the prerequisite conditions for the execution of one or more tasks on the processor 104. For each task, one or more inputs 114, or combinations thereof, may be present or absent as a "trigger" before the task can proceed to execute on the processor 104. An arbitrary number of triggers can be input into the task selection device 102 from around the wider system. For example, a task may require the availability of a resource such as space in a buffer, availability of data in a memory or buffer, or availability of a direct memory access (DMA) channel. A task may require that multiple conditions be met in order to run, which can be combined in an arbitrary way, for example: (input 1 AND input 3 AND not input 5) OR (input 6 OR input 7). The selection of which inputs are relevant for each task is done by task input selectors 118, 120, 122, and 124 for tasks 140, 142, 144, and 146, respectively. Each task input selector may select a different set of inputs for each task. The logic to determine whether each task may be in a condition to run is contained within hardware logic 126.

The inputs 114 enter the task selection device 102 at bus 116 which provides the inputs 114 to individual task input selectors 118, 120, 122, and 124, from which a subset of selected inputs are input into the hardware logic 126. For example, from a set of M possible task trigger inputs 114, a subset of N inputs may be selected by an input selector for a particular task. Input selectors 118, 120, 122, and 124 select the inputs 114 relevant for tasks 140, 142, 144, and 146, respectively, and supply these inputs 114 to the hardware logic 126. The input selectors 118, 120, 122, and 124 transmit the status information derived from the inputs 114 as status bits. In some implementations, the inputs 114 may be input both as external inputs and located in I/O mapped registers. The hardware logic 126 utilizes an arbitrary logic equation for each set of selected inputs for each task to determine whether the received inputs 114 fulfils the prerequisite conditions to permit execution of one or more tasks on the processor. Alternatively, in some embodiments, the hardware logic 126 utilizes lookup tables to determine from the triggers whether the received inputs 114 fulfils the prerequisite conditions to permit execution of one or more tasks on the processor 104. In the example case of four inputs 114 selected by each of the input selectors 118, 120, 122, and 124, the hardware logic 126 utilizes four 16-bit lookup tables, indicating the outcomes of the 16 possible combinations of the four selected inputs. In the general case of N inputs selected for a task, a $2^N$ bit lookup table would be employed for that task.

The hardware logic 126 can be programmed to represent any arbitrary logic, providing flexibility as to the conditions under which tasks can be enabled. The programmer or manufacturer can determine the tasks to be enabled by the hardware logic 126 and the inputs 114 which are prerequisite to the execution of the tasks by programming the lookup tables of hardware logic 126 and the selection registers (not shown for clarity) of the input selectors 118, 120, 122, and 124. The available tasks are set up statically at start-up of the task selection device 102, each task with a selected subset of task trigger inputs and set of prerequisite conditions necessary for execution of the task. The arbitrary logic equations describing the prerequisite conditions for each of the tasks are also pre-determined at start-up. At any time after start-up, the selected subset of inputs and set of prerequisite conditions may be changed by reprogramming, When the hardware logic 126 determines that the inputs 114 indicate that the conditions for execution of a particular task are met, then the task is considered for scheduling at the processor 104. The hardware logic 126 transmits enable status signals for each of the tasks enabled by the received inputs 114 to be considered for scheduling to the arbiter 110. When a task enable status signal is high, the task is considered for scheduling and the arbiter 110 selects one of the tasks using an arbitration algorithm, such as round-robin, weighted round-robin, fixed priority and so on. The arbiter 110 may include a mode register (not shown for clarity) which includes bits that can be set in order to select the arbitration algorithm.

The hardware logic 126 most often presents the enable status signals to the arbiter 110 via an enable function 128. For example, in a case where there are eight possible tasks, eight individual signal wires 127 (represented by the single line in FIG. 1) may extend from the hardware logic 126 to the arbiter 110. The enable function 128 has its own task enable register with bits for each task (not shown for clarity) to override the decision of the hardware logic 126, such that unless both the enable register bit and the status signal for a task are set, the status signal for that task at the output of the enable function 128 is reset. This provides an override mechanism to disable one or more tasks, regardless of the state of the inputs 114.

Conversely, a force function 130 may be used to override the hardware logic 126 in some circumstances. The force function 130 has its own task force register with bits for each task (not shown for clarity), such that if either the enable register bit or the status signal for a task are set, the status signal for that task at the output of the enable function 128 is set. Setting the force register bit for a task will cause the task to be considered for scheduling, irrespective of the state of the hardware logic 126 and the inputs 114. The force function 130 provides a mechanism to enable one or more tasks, so that those tasks should always be considered for scheduling.

The arbiter 110 determines the next task to be executed based on the state of the signal wires 127 indicating enabled tasks to be considered for scheduling and the history of previously scheduled tasks. The arbiter 110 determines an order of tasks according to a pre-determined method, such as a priority rule, round-robin, or weighted method. A task will not be run if the enable function 128 is not set for the task.

The enable function 128 and force function 130 allows the system to dynamically and rapidly respond to unusual, temporary or specific conditions by immediately enabling or disabling tasks. For example, if a particular component is unavailable or disabled, tasks that rely on the availability of this component can be disabled by setting the related bits of the status register of the enable function 128 to zero, without having to modify the lookup table. The tasks that rely on the particular component will not be considered for scheduling by the arbiter 110 because the enable function 128 will not be set for the tasks. Conversely, the force function 130 can force a task or tasks to be considered for scheduling due to some rare event, for example a power loss event where a limited time is available with a limited backup power source (such as a capacitor or a battery) to complete certain essential tasks. The enable function 128 and force function 130 can therefore override the decision of the hardware logic 126 and allow the system to respond quickly to unusual or temporary conditions without having to re-program the hardware logic 126 or the selection registers of the input selectors 118, 120, 122, and 124.

The arbiter 110, after choosing a next task to be executed on the processor 104, outputs a task ID to reference a function pointer table 112 which in turn outputs a task address which is the entry point in program address space of the task function. The entry point address of the task may be stored in a RAM, for example, static RAM (SRAM) which is accessible by the processor or directly in a processor register. The processor uses this stored entry point address to transfer execution to the next scheduled task without the added overhead of polling registers to see which tasks may be run. This may be performed by the processor reading the stored entry point address and performing a jump directly to it, or by executing a task schedule instruction which causes the stored entry point address to be loaded into the program counter of the processor, thereby transferring execution to the next scheduled task. Because the inputs 114 are evaluated in the hardware logic 126 to determine which tasks can be executed based on conditions of required components, no polling of registers is required and tasks which are scheduled by the arbiter 110 can be executed on the processor 104 without further software decisions. Scheduling of tasks which are already known to be executable provides a seamless transition between one task and the next.

Tasks run to completion on the processor 104, and then the arbiter 110 determines a next task to be run based on the enabled tasks presented by the hardware logic 126. Once the arbiter 110 determines the next task for execution, the arbiter 110 uses the determined task ID to reference the function pointer table 112, the output of which is stored as the entry point address of the determined task and used by the processor to transfer execution to the determined next task.

The function pointer table 112 provides to the processor 104 an address of the next task to be executed. The output of the function pointer table 112 may be stored in a memory 132 connected to the processor 104, which may be an SRAM or a register of the processor, which the processor 104 either reads and jumps to directly or uses the task schedule instruction to load the contents of the special register into the program counter of the processor 104, i.e. perform a jump to the address stored in the register. In this way the processor 104 may transfer execution from one task to another when instructed to by a task, wherein execution is transferred to the entry point which has most recently been selected and stored by the task selection logic. The transfer of execution is generally used at the end of normal processing for each task. The transfer of execution causes the processor 104 to jump to the entry point address of the next scheduled task as output by the function pointer table 112 addressed by the arbiter 110, eliminating any need for a register read.

The transfer of execution can also optionally be used in order to yield between tasks at any point of execution within a task. For example, when the task cannot progress to completion, for example because of the unavailability of a resource, the task may include a branch which calls the special instruction to instruct the processor 104 to jump to the next task immediately rather than wait for the current task to complete. A task may be exited before completion when a resource which is not a prerequisite for enabling of the task is not available, or if a resource which is a prerequisite for enabling the task is no longer available. Yielding of one task for another may require that the task-specific current state be saved and restored when the task is resumed. The execution of the special instruction immediately changes the program counter of the processor 104 to the next task which is able to run on the processor 104, thereby significantly reducing the overhead. The special instruction is dynamic and based on the output of the arbiter 110 and the contents of the function pointer table 112. The function pointer table may be reprogrammable, for example by implementing in a non-volatile memory such as NAND flash memory, thereby enabling multiple tasks or entry points in a task to be addressed with a single task ID. The function pointer table 112 may be programmed upon first instantiation or installation of the software tasks required to be run on the processor 104, then may be reprogrammed if the software tasks are updated or changed.

In some implementations, when a task yields to another task before completion, the prerequisite conditions required for the particular task to run are updated in the hardware logic 126 to include the availability of an additional resource or removal of an unavailable resource. In some implementations, prior to executing the special instruction, the function pointer table 112 may be updated to contain the address following the yield branch point, such that the next time the task is selected by the arbiter 110, the task will resume at the point after the branch was taken. In some implementations, the task may be programmed to branch to a yield instruction in the middle of the task in order to allow another task to complete after a particular number of CPU cycles have been spent on the particular task. In some implementations, when a task yields to another task the processor 104 performs an automatic bulk save of the context of the task, including the internal state of the processor 104, to a stack area associated with the task being exited.

As an illustrative example of the task scheduling process, a processor 104 may include a fetch task, among other available tasks. The hardware logic 126 receives inputs indicating the availability of various resources and determines if the conditions required for execution of the fetch task are met. In the example case, the fetch task may require only one prerequisite condition: the presence of data in the FIFO. The fetch task is enabled by the presence of data in the FIFO, which is indicated as an input 114. The hardware logic 126 determines that the fetch task can be executed based on the current status of the FIFO, and outputs the fetch task enable signal to the arbiter 110 to schedule execution on the processor 104.

If the hardware logic 126 determines that no task can be executed on the processor 104, the hardware logic 126 may transmit to the arbiter 110 an enable signal for a null task, or alternatively, the arbiter 110 may assume that if no task is enabled, then it should output a null task ID. The null task may be a sleep command which allows the processor 104 to enter a low power state until another task is enabled. The null task may be ended by the presence of an enable signal of a task transmitted to the arbiter 110. By enabling a null task when no other tasks are available, the arbiter 110 improves efficiency of the system and reduces power usage.

Figure 2:
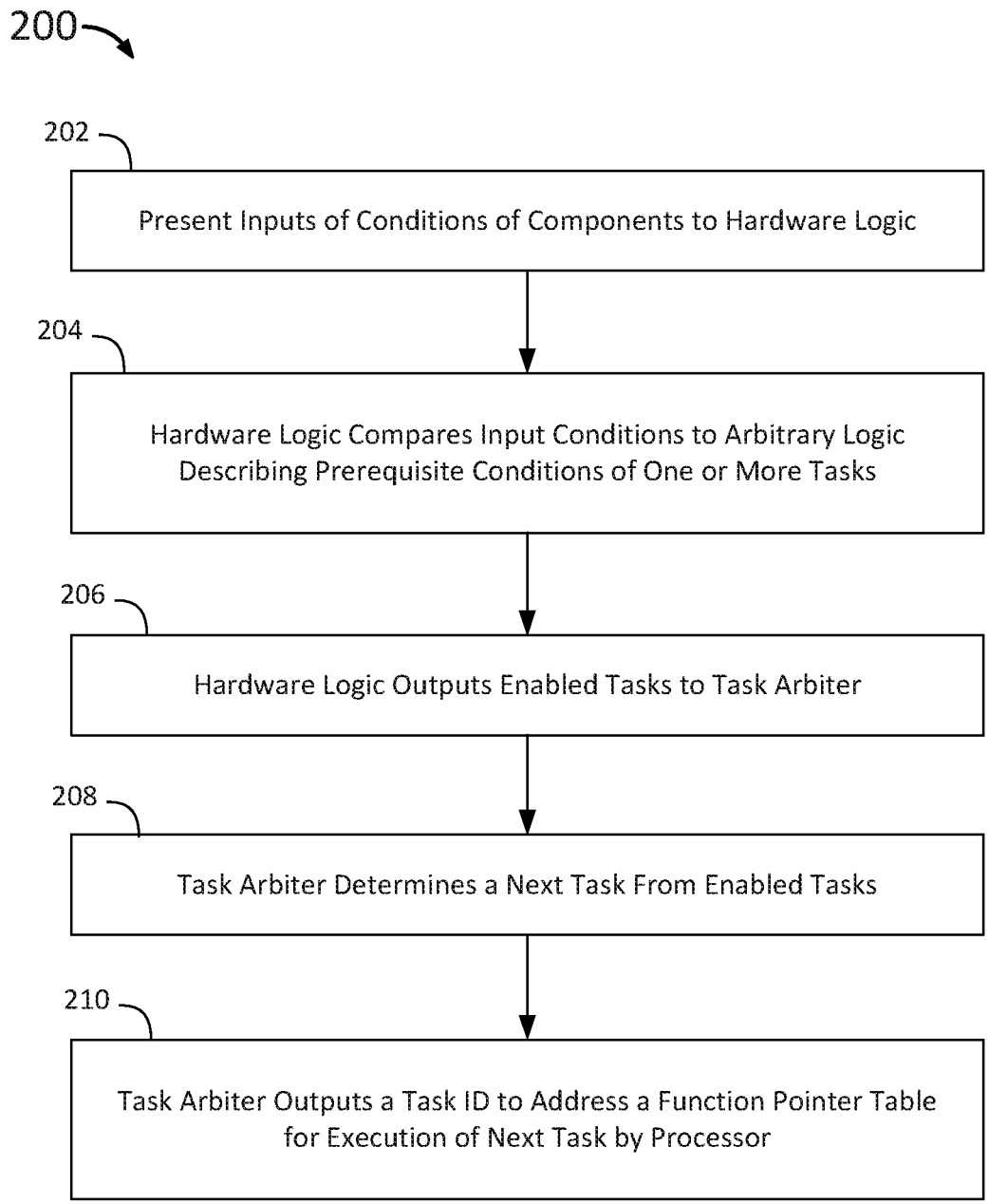
FIG. 2 shows a block diagram of a task scheduling method.

FIG. 2 shows a flow diagram of a simplified task scheduling method 200. The task scheduling method begins at step 202 when inputs (for example inputs 114 in FIG. 1) related to the availability of resources or notification of events to a processor (for example processor 104 in FIG. 1) or within a computing device are presented to the hardware logic (for example hardware logic 126 in FIG. 1). The inputs may be presented as bit status indicators for particular conditions or events which are prerequisites to the execution of a task on the processor. At step 204, the hardware logic compares the input conditions with an arbitrary logic or lookup table describing the prerequisite conditions for execution of one or more tasks. At step 206, the hardware logic outputs any tasks which are enabled by the inputs to a task arbiter (for example arbiter 110 in FIG. 1).

At step 208, the task arbiter determines a next task from the enabled tasks. The task arbiter determines the next task based on a history of tasks executed at the processor and a pre-determined method for selection of a next task, such as priority rules, round-robin, or weighting of tasks. At step 210, the task arbiter outputs a task ID to address a function pointer table (for example function pointer table 112 in FIG. 1) to the chosen next task for execution by the processor.

Figure 3A:
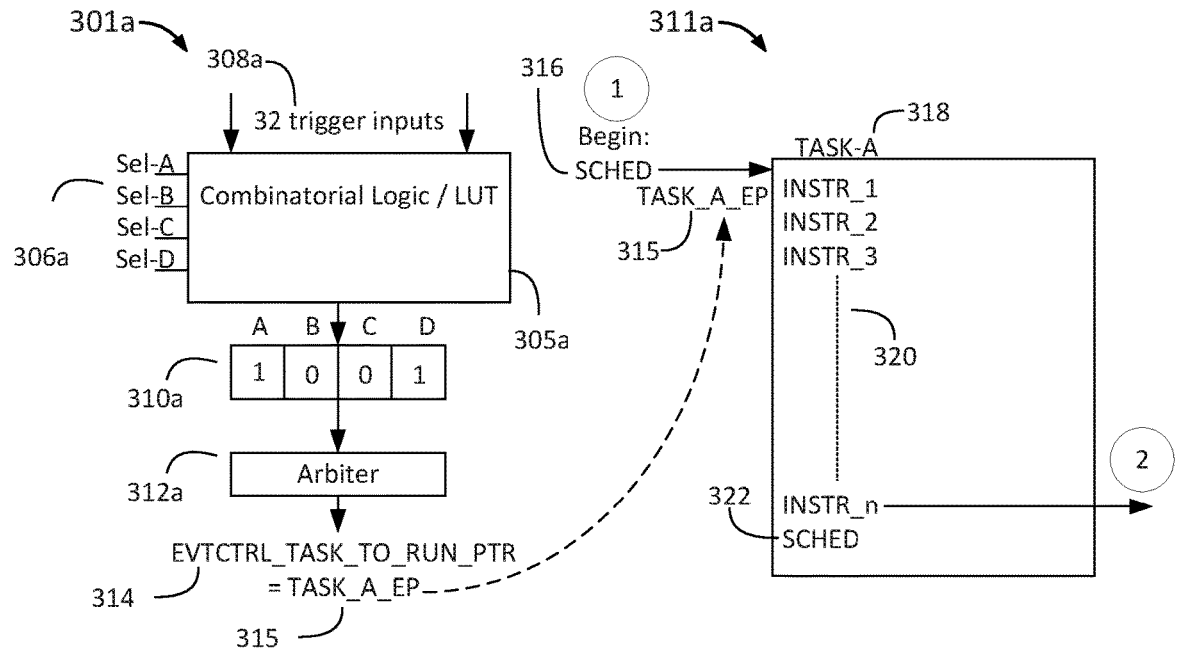
FIG. 3A shows a block diagram of the operation of the task scheduling device and processor execution of a first task at a first time.
Figure 3B:
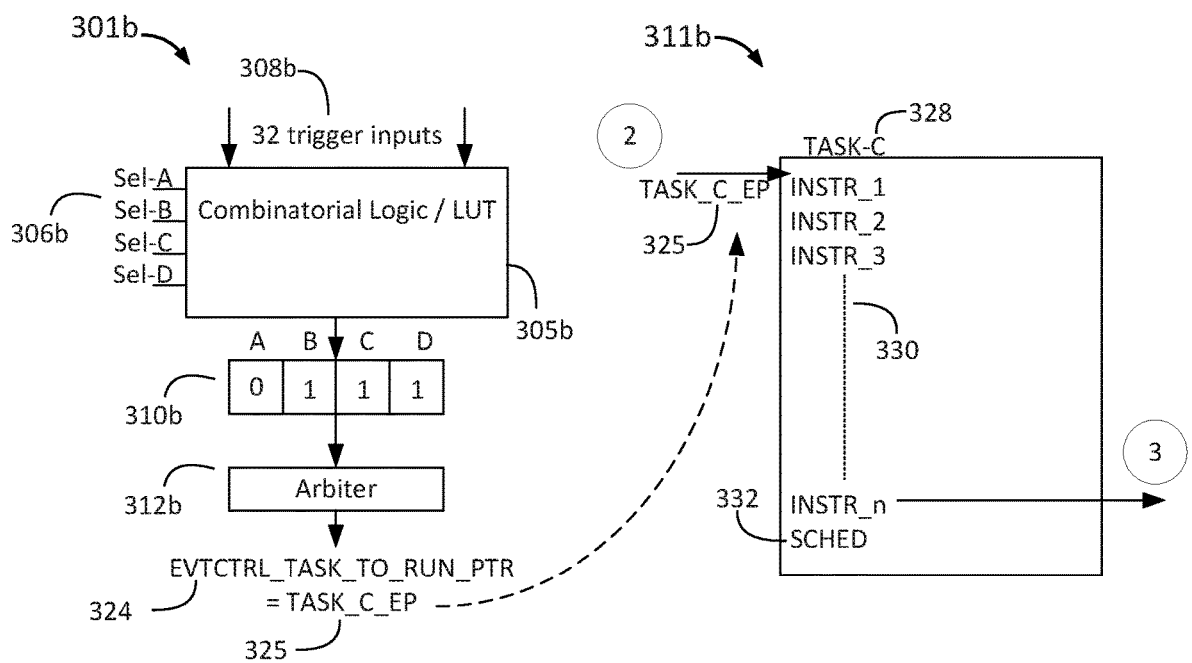
FIG. 3B shows a block diagram of the operation of the task scheduling device and processor execution of a second task at a second time.
Figure 3C:
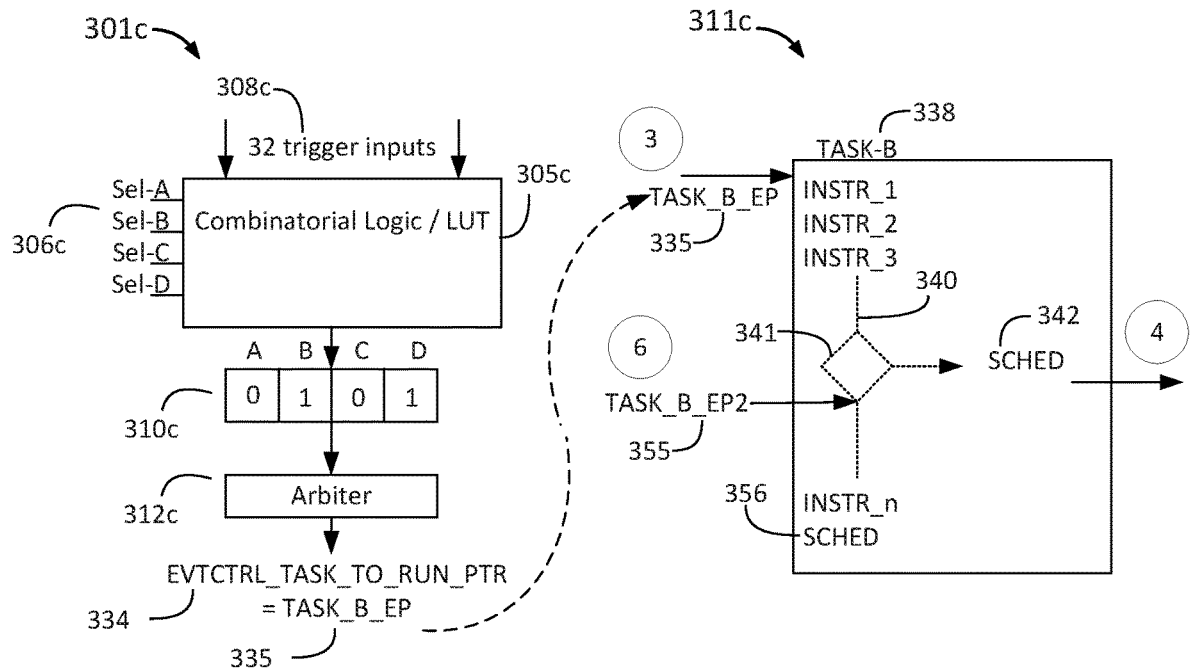
FIG. 3C shows a block diagram of the operation of the task scheduling device and processor execution of a third task at a third time.
Figure 3D:
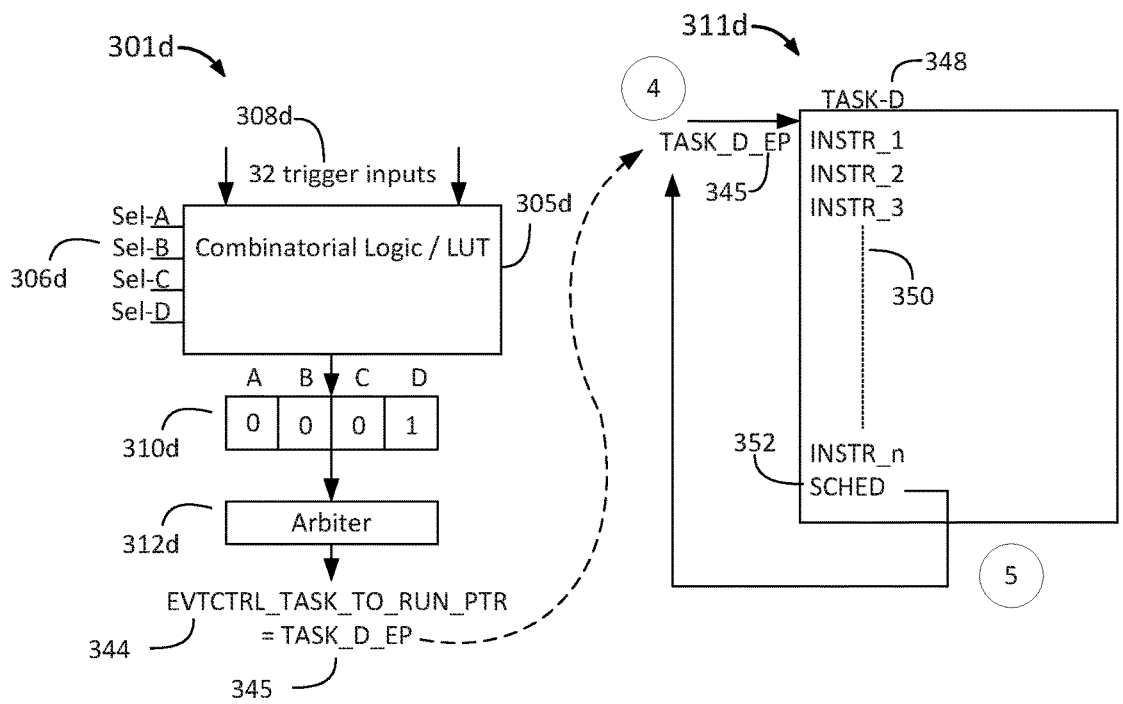
FIG. 3D shows a block diagram of the operation of the task scheduling device and processor execution of a fourth task at a fourth time.

FIGS. 3A, 3B, 3C, and D illustrate an example of the operation of the automated task scheduling method by showing the task selection device and processor execution during execution of four tasks over four points in time. FIG. 3A shows a block diagram of the operation of the task selection device 301a and program counter 311a of a processor during execution of a first task at a first time point. FIG. 3B shows a block diagram of the operation of the task selection device 301b and program counter 311b of a processor during execution of a second task at a second time point. FIG. 3C shows a block diagram of the operation of the task selection device 301c and program counter 311c of a processor during execution of a third task at a third time point. FIG. 3D shows a block diagram of the operation of the task selection device 301d and program counter 311d of a processor during execution of a fourth task at a fourth time point.

For clarity, FIGS. 3A-D illustrate an example in which there are four possible tasks which can be executed on the processor: A, B, C, and D. The four tasks include prerequisite conditions described by 32 input triggers. In some embodiments, there may be any arbitrary number of possible tasks which can be run on the processor, for example eight tasks.

FIG. 3A illustrates the state of the task selection device at a first point in time (Point 1) 301a, including a state of the trigger inputs 308 and select inputs 306a to the hardware logic 305a. Each of the select inputs 306a, Sel-A, Sel-B, Sel-C and Sel-D, selects a different subset of the 32 possible trigger inputs for Tasks A, B, C and D respectively. Based on the trigger inputs 308a and the select inputs 306a, the hardware logic 305a determines that Task A and Task D of possible tasks 310a are ready to run, and presents these tasks to the task scheduling arbiter 312a as an input. The possible tasks 310a are shown as status bits presented to the arbiter 312a. The arbiter 312a selects Task A and addresses, with the task ID of task A, the pointer table 314 which outputs the value (TASK_A_EP) 315 which is the entry point address of Task A. FIG. 3A illustrates the processor execution passing to Task A 318 by executing the SCHED 316 instruction at Point 1. When the SCHED 316 instruction is executed, the program counter 311a of the processor is loaded with the entry point of Task A, TASK_A_EP 315, from the pointer table 314 and the execution transfers to Task A 318.

Task A executes its instructions 320, INSTR_1, INSTR_2 . . . INSTR_n, and then at Point 2 yields control to another task by executing the SCHED 322 instruction again. FIG. 3B illustrates the state of the task selection device 301b at Point 2 in time, after Task A 318 has yielded control. The state of the trigger inputs 308b and select inputs 306b indicate that Task B, Task C, or Task D of the possible tasks 310b are ready for execution. The arbiter 312b selects TASK C and the addresses, with the task ID of task C, the pointer table 324 which outputs the value (TASK_C_EP) 325 which is the entry point address of Task C.

At Point 2 in FIG. 3B, the execution of the processor passes to Task C 328 as the next task for execution on the processor. Execution of the SCHED instruction 322 at the end of execution of Task A 318 (shown in FIG. 3A) loads the program counter 311b with the entry point address for Task C 325 (TASK_C_EP), the next task for execution as determined by arbiter 312b. Task C 328 executes its instructions 330, INSTR_1, INSTR_2 . . . INSTR_n, and then comes to a point where its instructions indicate yielding control to another task by executing the SCHED 332 instruction at Point 3.

FIG. 3C illustrates the state of the task selection device 301c at Point 3 in time, after Task C 328 has yielded control (shown in FIG. 3B). The state of the trigger inputs 308c and select inputs 306c indicate that Task B or Task D of the possible tasks 310c are ready for execution. The arbiter 312c selects TASK B and addresses, with the task ID of task B, the pointer table 334 which outputs the value (TASK_B_EP) 335 which is the entry point address of Task B. At Point 3 in FIG. 3C, the execution of the processor is passed to Task B 338 as the next task for execution on the processor. Execution of the SCHED instruction 332 at the end of execution of Task C (shown in FIG. 3B) 328 loads the program counter 311c with the entry point address for Task B 335 (TASK_B_EP).

Task B 338 executes its instructions 340, INSTR_1, INSTR_2 . . . INSTR_n, and then comes to a decision point 341 where Task B 338 it unable to continue. For example, Task B may require a resource to become available or for an input to be made available. Task B 338 yields control to another task by executing the SCHED 342 instruction at Point 4 rather than complete execution of its instructions.

FIG. 3D illustrates the state of the task selection device at a fourth time 301d, after Task B 338 has yielded control. The state of the trigger inputs 308d and select inputs 306d indicate that only Task D of the possible tasks 310d are ready for execution. The arbiter 312d selects TASK D and addresses, with the task ID of task D, the pointer table 344 which outputs the value (TASK_D_EP) 345 which is the entry point address of Task D. At Point 4 in FIG. 3D, the execution of the processor passes to Task D 348 as the next task for execution on the processor.

Task D 348 executes its instructions 350, INSTR_1, INSTR_2 . . . INSTR_n. At the end of Task D 348, the SCHED 352 instruction is executed at Point 5. At this point there is no other task ready to run, so execution of the SCHED instruction 352 at the end of execution of Task D 348 loads the program counter 311d with the entry point address for Task D 345 (TASK_D_EP). Task D may be a background task, or any other task that runs whenever there is no other task available to run, for example a null task such as a low power sleep. If there were another task ready for execution, the arbiter 312d would choose that task in preference to task D, as occurred in FIG. 3A-3C. If at any time another task is enabled by input conditions meeting the prerequisite conditions for execution, the task will be selected by the arbiter 312d and execution will transfer to the entry point of that task.

The entry points of tasks are set up before execution begins by storing the address values in the function pointer table (for example function pointer table 112 in FIG. 1). The function pointer table can be updated at any time. For example, in FIG. 3C, Task B could update the function pointer table with the address TASK_B_EP2 355 upon reaching the decision to yield 341 before completion, such that when Task B 338 is next selected by the arbiter 312c, control would transfer to the address TASK_B_EP2 355 at Point 6 to the instruction after decision point 341. Task B 338 would then resume execution at the point after it had decided to yield, and the instructions would execute until completed when the SCHED instruction 356 would be executed to prompt the arbiter 312c to update the function pointer table.

Figure 4:
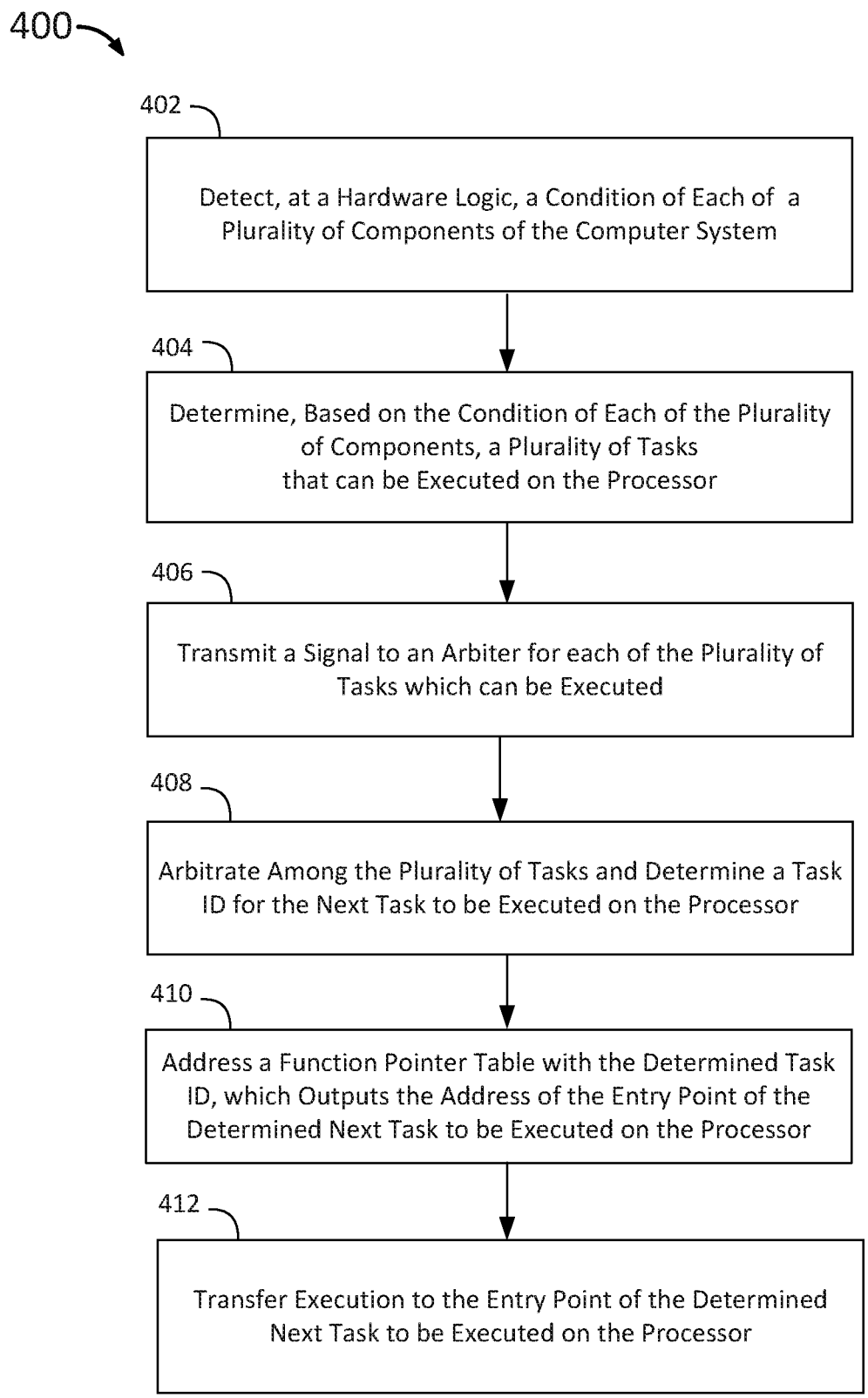
FIG. 4 shows a flow diagram for a method of automated task scheduling.

FIG. 4 shows a flow diagram 400 for a method of automated task scheduling. At step 402, the hardware logic (for example hardware logic 126 in FIG. 1) detects a condition of each of a plurality of components of the computer system. The hardware logic takes in a collection of events from the various hardware peripherals or computer system components and allows an arbitrary logic function of inputs to be programmed as a task enable. The hardware supports a number of programmable tasks, for example four, seven, or more tasks, and one default task ("null task") which is called when no other tasks can be executed. The default task may be a sleep task which places the processor in a low power sleep mode. The conditions of the plurality of components of the computer system are selected to be those which are prerequisites for execution of one or more tasks on the processor (for example processor 104 in FIG. 1).

At step 404, the hardware logic determines, based on the condition of each of the plurality of components, a plurality of tasks that can be executed on the processor. The hardware logic utilizes arbitrary logic or a lookup table to determine the tasks for which all prerequisite conditions are met by the conditions of the components. A task enable signal is passed on to the arbiter (for example arbiter 110 in FIG. 1) only when the prerequisite conditions for execution of the task are fulfilled. At step 406, the hardware logic transmits an enable signal to an arbiter for each of the plurality of tasks which can be executed.

At step 408, the arbiter arbitrates among the plurality of tasks and determines the task ID of the task of the plurality of tasks which is to be next executed on the processor. The arbitration of the enabled tasks is built in to the arbiter, according to a priority rule, round-robin method, or weighted scheduling technique. The hardware of the arbiter is programmed with task IDs for each of the eight possible tasks, which is used to address a function table pointer which outputs the address of the entry point of the task to a special register so that instruction microcode of a special instruction simply loads the processor program counter with the special register to jump to the next task.

At step 410, the arbiter addresses, with the determined task ID, a function pointer table (for example function pointer table 112 of FIG. 1) which outputs the address of the entry point of the determined task to be executed on the processor. At step 412, the processor transfers execution to the entry point of the next task determined by the arbiter. The processor executes the task knowing that the task has useful work to do because its prerequisite conditions are already known to be met. This technique eliminates conventional methods which rely on polling of multiple task functions in a sequential loop, and eliminates the need for most conditional checks for each of the task functions to determine whether all conditions are in place to proceed with execution to do useful work.

Figure 5:
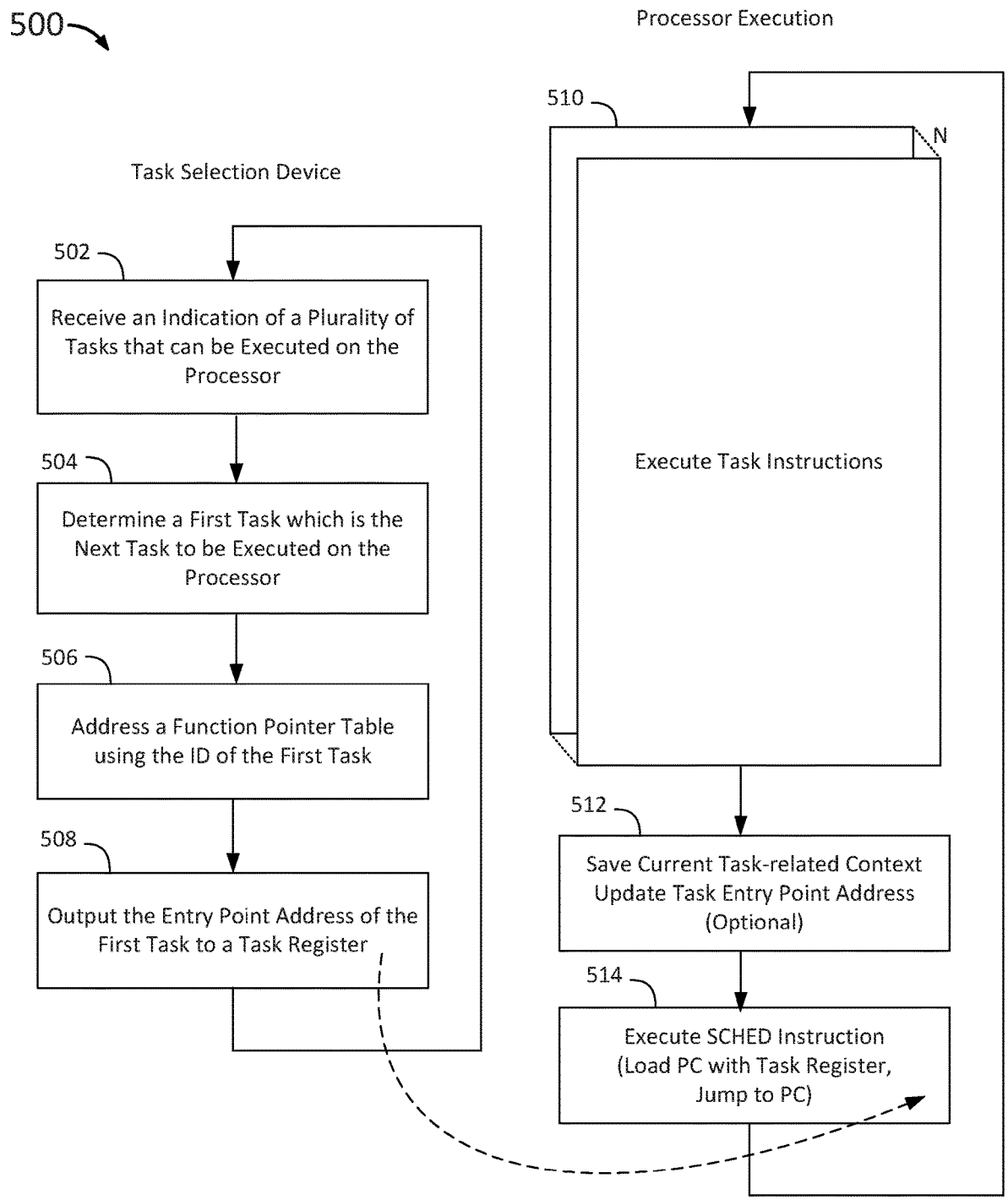
FIG. 5 shows a system flow diagram for automated task scheduling.

FIG. 5 shows a system flow diagram 500 for automated task scheduling. On the left-hand side, steps 502, 504, 506 and 508 show the steps taken by the Task Selection Device (for example task selection device 102 in FIG. 1). On the right-hand side, steps 510, 512 and 514 show the steps taken by the processor (for example processor 104 in FIG. 1) as it executes. At step 502, the arbiter (for example arbiter 110 in FIG. 1) receives from hardware logic (for example hardware logic 126 in FIG. 1) an indication of a plurality of tasks where the state of the components of the computer system are such that the tasks can be executed on a processor. At step 504, the arbiter determines a first task which is the next task of the plurality of tasks to be executed on the processor. At step 506, the arbiter addresses, using the task ID of the first task, a function pointer table (for example function pointer table 112 in FIG. 1). At step 508, the function pointer table outputs the entry point address of the first task which is loaded into a task register of the processor, following which the process repeats.

At step 510, the processor executes task instructions which may be of a total of N possible tasks that may execute. The processor continues to process task instructions until it reaches the end of task activities, which may be at the very end of the task, or at some point in the middle of the task where it decides for any reason to finish its activities and yield to another task.

At step 512, the arbiter may optionally save the current task-related context related to the task and update the task's entry point address in the function table pointer (in the event the task has been unable to fully complete processing and wishes to resume at the point after it yields, for example). Since this step is optional, the process of task switching can be made more efficient by removing the overhead of task context saving and restoring performed in some operating system based task switching systems. At step 514, the processor executes a SCHED instruction, which loads the processor program counter (PC) with the current contents of the task register (which has been loaded with the entry point address of the first task in step 508). The SCHED instruction may, in some implementations, read the output of the function pointer table directly and store the value in the PC.

The processor returns to executing task instructions at step 510. Which task instructions of the possible N tasks are executed is determined by the state of the program counter which in turn will depend on the contents of the task register set in step 508 or the value of the function pointer table output read in step 514.

This may include a null task if there is no active task which is enabled to be executed at step 504, where the arbiter will determine that no tasks can currently be executed on the processor based on the trigger status bits transmitted to the arbiter from the hardware logic. The null task may be a sleep or power down task which allows the processor to enter a low power state when there is nothing else for the processor to do until a different task can be run. In some implementations, the null task may periodically end its instructions and return to step 514 where the contents of the task register or the output of the function pointer table will contain the entry point address of any task which is to be next executed on the processor. The execution of a null task requiring a lower power state reduces the power consumption of the processor.

Using hardware logic to determine tasks which can be executed on a processor and presenting the arbiter with only tasks that can currently be executed eliminates wasted cycles by allowing it to automate the scheduling of independent tasks without the need for polling registers for each task in turn, by using an instruction which automatically jumps to the next task which has been selected to be run by the arbiter. The method removes the overhead of continually calling any task until such a point that conditions are fulfilled so that the command can be run, removing the need for each task to read status registers on entry, because it is implicit from the fact that the task is running that the prerequisites are met. This allows for more efficient use of available CPU cycles, reducing power and time taken, as well as energy consumed, to perform any given task-based activity.

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

What is claimed is:

1. A method for scheduling tasks on a processor, the method comprising:
   detecting, at hardware logic of a task selection device communicatively coupled to the processor, a condition of each of a plurality of components of a computer system which comprises the processor;
   inputting the condition of each of the plurality of components as a status bit in the hardware logic;
   determining, based on the condition of each of the plurality of components, a plurality of tasks that can be executed next on the processor by determining if the plurality of status bits meet a set of conditions required to execute each task of the plurality of tasks;
   transmitting a signal to an arbiter of the task selection device, indicating that the plurality of tasks can be executed;
   selecting, at the arbiter, a first task of the plurality of tasks to be executed next on the processor;
   determining, by the task selection device, an entry point address of the first task; and
   transferring, by the processor, execution to the entry point address of the first task.

2. The method of claim 1, wherein the condition of each of the plurality of components comprises an availability of a resource related to a component of the processor.

3. The method of claim 1, wherein transmitting a signal to an arbiter indicating that the plurality of tasks can be executed comprises transmitting an enable signal for each task of the plurality of tasks to the arbiter.

4. The method of claim 1, wherein determining an entry point address of the first task further comprises determining, by the processor, the entry point address of the first task by accessing a function pointer table of the task selection device.

5. The method of claim 1, further comprises storing, by the task selection device, the entry point address of the first task in a memory communicatively coupled to the processor.

6. The method of claim 5, wherein the memory is a register of the processor or a RAM memory.

7. The method of claim 6, the wherein transferring, by the processor, execution to the stored entry point address of the first task comprises either:
   copying the contents of the register to the program counter of the processor; or,
   executing an instruction which uses the register to jump to the entry point address of the first task.

8. The method of claim 6, the method further comprising:
   determining, by the first task that it wishes to yield execution to a different task;
   selecting, at the arbiter, a second task of the plurality of tasks to be executed on the processor;
   determining, by the task selection device, a second entry point address of the second task;
   storing, by the task selection device, the second entry point address of the second task; and
   yielding, by the first task, execution to the second task.

9. The method of claim 8, the method further comprising:
   if it is determined that no tasks can be executed on the processor based on the condition of the plurality of components, transmitting a null task signal to the arbiter.

10. The method of claim 1, detecting at the hardware logic the condition of each of a plurality of components of the computer system further comprises storing the condition of each of the plurality of components in a register.

11. The method of claim 1, wherein selecting, at the arbiter, is performed based on one of a round robin selection method, a fixed priority-based selection method, or a weighted selection method.

12. A system for automated scheduling of a plurality of tasks on a processor, the system comprising:
   components necessary for the execution of the plurality of tasks;
   a memory communicatively coupled to the processor;
   a task scheduling device communicatively coupled to the memory, the task scheduling device comprising:
      hardware logic configured to:
         receive a plurality of trigger conditions from the components;
         change a status bit within the hardware logic for each of the plurality of triggers; and
         determine, based on programmed relationships between the trigger conditions stored as status bits within the hardware logic, a plurality of tasks that can be next executed; and
      an arbiter configured to:
         receive an enable signal for each of the plurality of tasks;
         determine the next task of the plurality of tasks to be executed on the processor; and
   wherein the processor is configured to execute one task of the plurality of tasks at a time and to schedule the next task to be executed on the processor.

13. The system of claim 12, wherein the memory is a register of the processor or a RAM memory.

14. The system of claim 13, wherein the processor is further configured to determine an entry point address of the next task to be executed by accessing a function pointer table of the task selection device.

15. The system of claim 13, wherein the task scheduling device is further configured to:
   store the entry point address of the next task to be executed in the memory; and
   a current task executing on the processor causes the processor to schedule the next task to be executed by either:
   copying the entry point of the next task to be executed from the memory to the program counter of the processor; or,
   executing an instruction which uses the entry point of the next task to be executed in the memory to jump to the next task.

16. The system of claim 15, wherein the current task executing on the processor is configured to:
   determine that the current task wishes to yield execution to the next task;
   save a required task context; and
   yield execution by causing the processor to schedule the next task.

17. The system of claim 16, wherein the hardware logic is further configured to:
   determine, based on the plurality of trigger conditions, that no task can be executed on the processor; and
   transmit to the arbiter an enable signal for a null task.

18. The system of claim 17, the arbiter configured to determine the next task of the plurality of tasks based on one of a round robin selection method, a fixed priority-based selection method, or a weighted selection method.

\* \* \* \* \*